Figure 1:
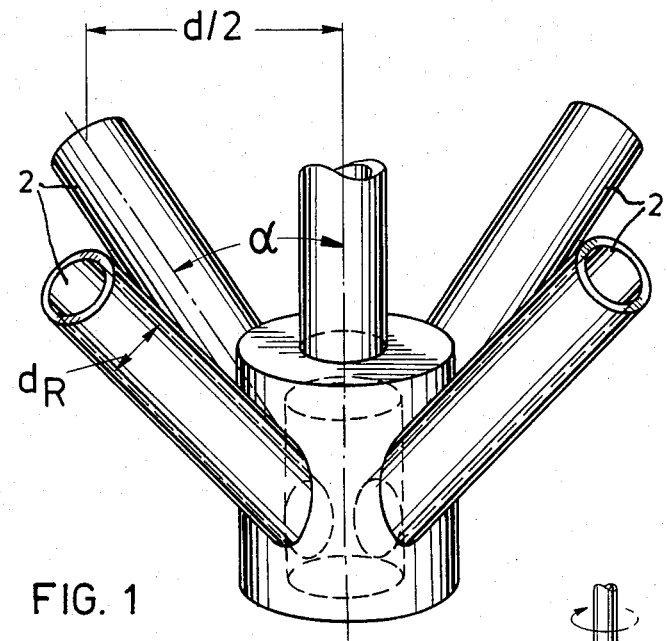

United States Patent [19]

Zlokarnik

[11] Patent Number: 4,508,546
[45] Date of Patent: Apr. 2, 1985

[54] MECHANICAL FOAM BREAKERS AND A PROCESS FOR MECHANICAL FOAM-BREAKING

[75] Inventor: Marko Zlokarnik, Cologne, Fed. Rep. of Germany

[73] Assignee: Bayer Aktiengesellschaft, Leverkusen, Fed. Rep. of Germany

[21] Appl. No.: 236,485

[22] Filed: Feb. 23, 1981

[30] Foreign Application Priority Data

Mar. 6, 1980 [DE] Fed. Rep. of Germany ....... 3008589

[51] Int. Cl.³ .............................................. B01D 19/02
[52] U.S. Cl. .......................................... 55/87; 55/178
[58] Field of Search ...................... 55/87, 178; 239/17, 239/225, 565; 252/321, 360–363; 415/83, 88, 213 R; 416/179, 186

[56] References Cited

U.S. PATENT DOCUMENTS

| | | | |
|---|---|---|---|
| 1,007,266 | 10/1911 | Burrell | 415/88 |
| 1,609,413 | 12/1926 | Kristoffersson | 55/178 |
| 1,967,938 | 7/1934 | Jantzen et al. | 55/178 |
| 2,276,404 | 3/1942 | Lundquist | 416/179 |
| 2,472,412 | 6/1949 | Fritz | 416/179 |
| 2,608,474 | 8/1952 | Gilliam | 422/123 |
| 2,805,889 | 9/1957 | Terry | 239/565 X |
| 3,100,027 | 8/1963 | Harris et al. | 415/88 X |
| 3,128,084 | 4/1964 | Castor | 416/179 |
| 3,213,592 | 10/1965 | Rich | 55/178 X |
| 3,256,677 | 6/1966 | Boucher et al. | 55/178 X |
| 3,301,490 | 1/1967 | Hruby, Jr. | 239/565 X |
| 3,501,414 | 3/1970 | Mueller | 55/178 X |
| 3,595,547 | 7/1971 | Polomsky et al. | 416/179 X |
| 3,773,258 | 11/1973 | Hruby, Jr. | 239/17 |
| 4,110,089 | 8/1978 | Muller | 55/178 |

FOREIGN PATENT DOCUMENTS

687262 9/1979 U.S.S.R. ................ 416/179

*Primary Examiner*—Robert Spitzer
*Attorney, Agent, or Firm*—Sprung Horn Kramer & Woods

[57] ABSTRACT

The present invention relates to a mechanical foam breaker containing a tube (1), and at least 3 channels (2) which branch outwards radially from the suction tube (1) at an angle α of approx. 30° to approx. 60°.

6 Claims, 6 Drawing Figures

FIG. 5
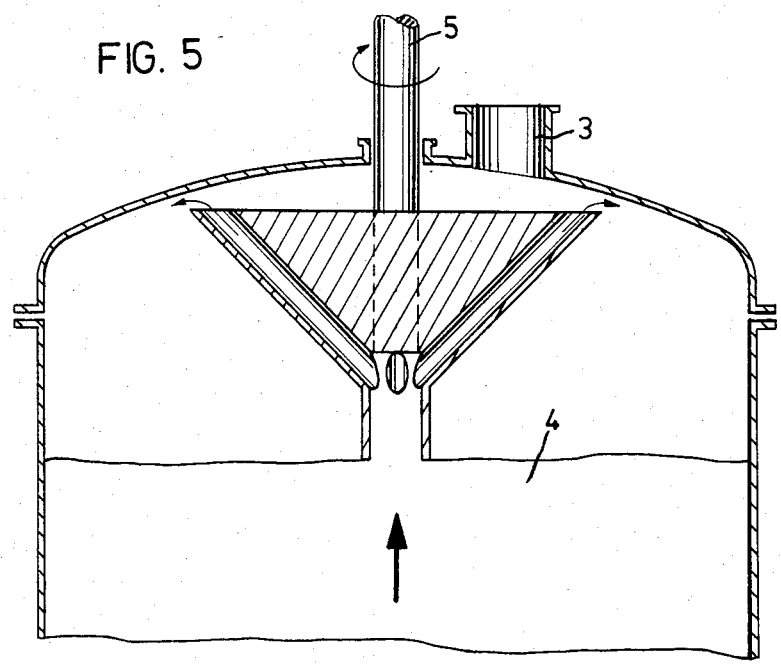
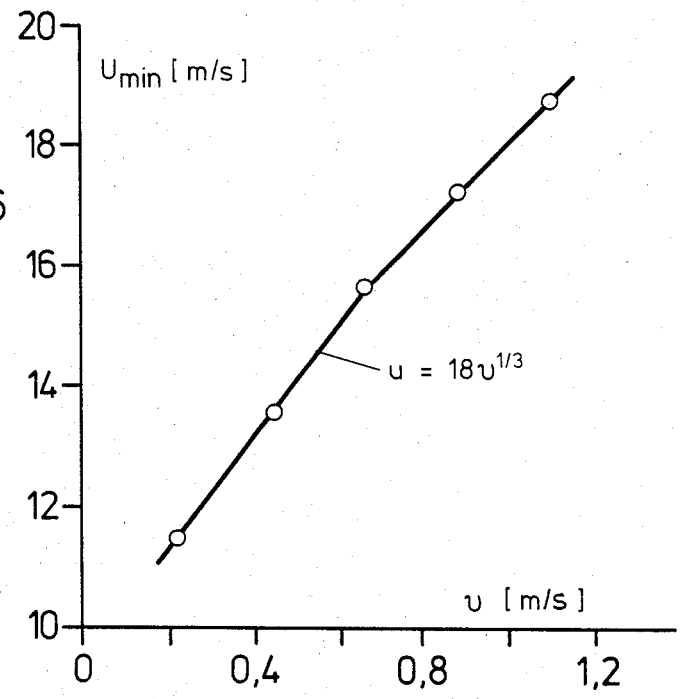
FIG. 6
$u = 18 v^{1/3}$

MECHANICAL FOAM BREAKERS AND A PROCESS FOR MECHANICAL FOAM-BREAKING

The subjects of the present invention are mechanical foam breakers as well as a process for mechanical foam breaking by means of mechanical foam breakers which each have a suction tube and at least three open channels which branch outwards radially from the suction tube at an angle $\alpha$ of about 30° to about 60°.

In chemical, microbiological and process operations in which a liquid phase is brought into contact with a gas, or in which gas forms, the problem of foam formation often arises. This undesired phenomenon is combated with chemical, thermal or mechanical means or methods.

The chemical method, the addition of defoamers, such as for example silicone oils, non-ionic surfactants etc., has the disadvantage that it changes the physical and chemical properties of the system and therefore in many cases cannot be applied. The thermal method, the heating of the foam, has often been found to damage the product and to be ineffective. Thus mechanical foam breakers are preferably used today for the removal of foam, especially in chemical and microbiological process technology.

The mechanical foam breakers remove the foam by subjecting it to shearing action and/or a centrifugal force. The first class includes injector and ejector nozzles which are operated with steam or compressed air, the second class includes the centrifuges and cyclones. In the case of rotating discs and paddle-wheels both operating principles are applied. A special foam centrifuge is for example described in F. Müller, Chem. Rundschau, 28 (1975) 18, pages 3 to 7.

A frequent disadvantage of the mechanical foam breakers, in particular of those of the paddle wheel type, is the fact that they throw out the "liquefied" foam with high kinetic energy so that this (liquefied foam) again produces foam on striking the wall of the vessel or the surface of the liquid. Many foam breakers, especially of the centrifuge type on the other hand have narrow channels distributed over a large area which tend to become blocked and are difficult to clean.

A mechanical foam breaker, which is to be used in particular in bioreactors, is required on the one hand to operate without damaging the biomass and to nevertheless have a high capacity and on the other hand to be free from blockages and not prone to incrustation and to be easy to clean, maintain and sterilize.

These requirements are fulfilled by the foam breaker according to the invention.

The subject of the invention is therefore a foam breaker which contains a hollow suction tube (1) and at least 4 open channels (2) which branch outwards radially from the suction tube at an angle of from approx. 30° to approx. 60°, preferably from approx. 40° to approx. 50°. The device is arranged immediately beneath the cover of the vessel, so that the liquefied foam thrown out hits the vessel cover at an angle which is as obtuse as possible and preferably almost tangential and is retarded by the cover without being able to produce fresh foam.

A further subject of the present invention is a process for mechanical foam breaking wherein the foam is drawn into a rotating suction tube of which at least 3 channels branch outwards radially at an angle $\alpha$ of about 30° to about 60° and is thrown outwards through these channels.

There is an essential difference between the foam breaker of the invention and the known foam centrifuges: The foam which passes upwards through the suction tube and is distributed evenly to the pipes is subjected in each pipe to a rotary motion from which it cannot escape because of the solid boundary (pipe wall). At the same time it is twisted, thickened and in this way effectively compressed; it leaves the pipes in the form of a gas/liquid mixture compressed into a flowable state, hereinafter termed liquefied foam.

Tests with devices of this type which are different but geometrically similar to each other (4 branching pipes; $\alpha=45°$; $d=80$; 120; 320 mm; $d/d_R=10$; d, $d_R$— see FIG. 1) were conducted in an apparatus which is illustrated schematically in FIG. 2. The system used was deionized water with the addition of 1 g/l of a very effective emulsifier of the alkyl ether sulphate type and air. The gas dispersing device used was a porous sinter plate. The air throughput and thus the foam formation was adjusted in such a way that the superficial gas velocity v in the suction tube of the foam breaker was always v=1000 m/h (=0.275 m/s). In the tests the rotational velocity u of the foam breaker ($\mu=\pi nd$, n=number of revolutions, d=diameter) was varied and the density of the liquefied foam produced was determined.

Figure 3:
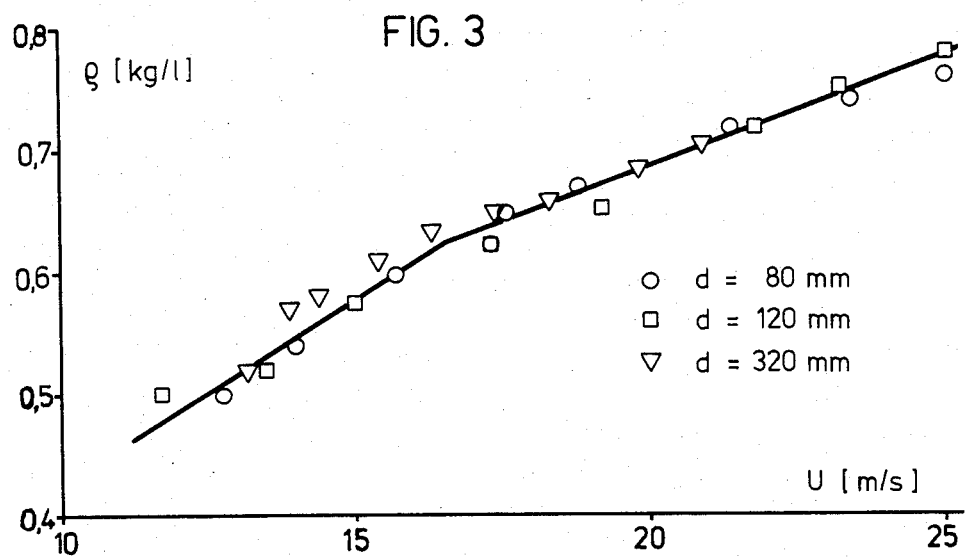

The diagram in FIG. 3 shows the dependence $\zeta=f(u)$. The importance of the rotational speed for the foam breaking process can be seen. For the foam, which has a density of 0.1 kg/l, to become flowable, it has to be condensed to a creamy liquid with a density $\rho$ of 0.5–0.6 kg/l. Further condensation is in most cases of no industrial interest; according to FIG. 3 such a density is only able to be achieved with a considerable increase in the rotational speed and therefore in the power consumption of the mechanical foam breaker.

Figure 2:
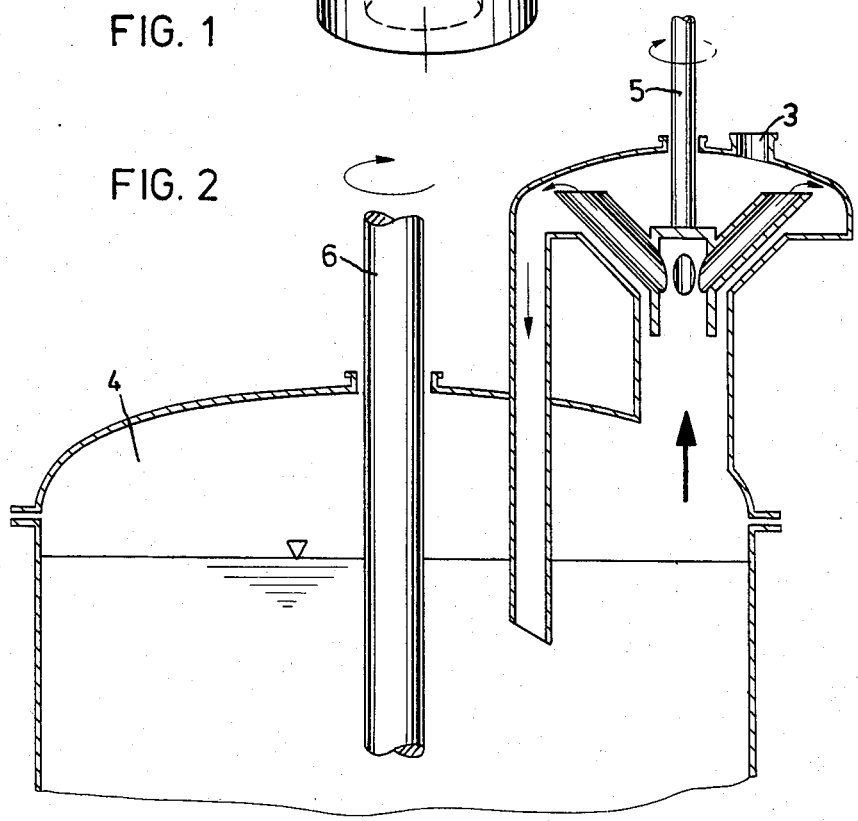

FIG. 2 shows the possibility of using the foam breaker according to the invention, in an off-gas pipe. The embodiment presented in FIG. 1 can also be used within a reaction vessel or bioreactor. However, since this foam breaker causes marked turbulence in the gas space with its branches, the prefered embodiment is the stream lined form as presented in FIG. 4, when used directly in the gas space. Tests with a foam breaker of the levelled type (4 channels, $\alpha=45°$; d=200 mm; $d/d_R=10$) which was arranged close to the cover of a vessel of 400 mm diameter, FIG. 5, and in which the same system was used as before, showed that this foam breaker is the most suitable for operation inside a vessel. FIG. 6 shows the dependence, determined in these tests, of the minimum rotational speed $u_{min}$ on the superficial gas velocity v of the foam in the suction tube.

Figure 4:
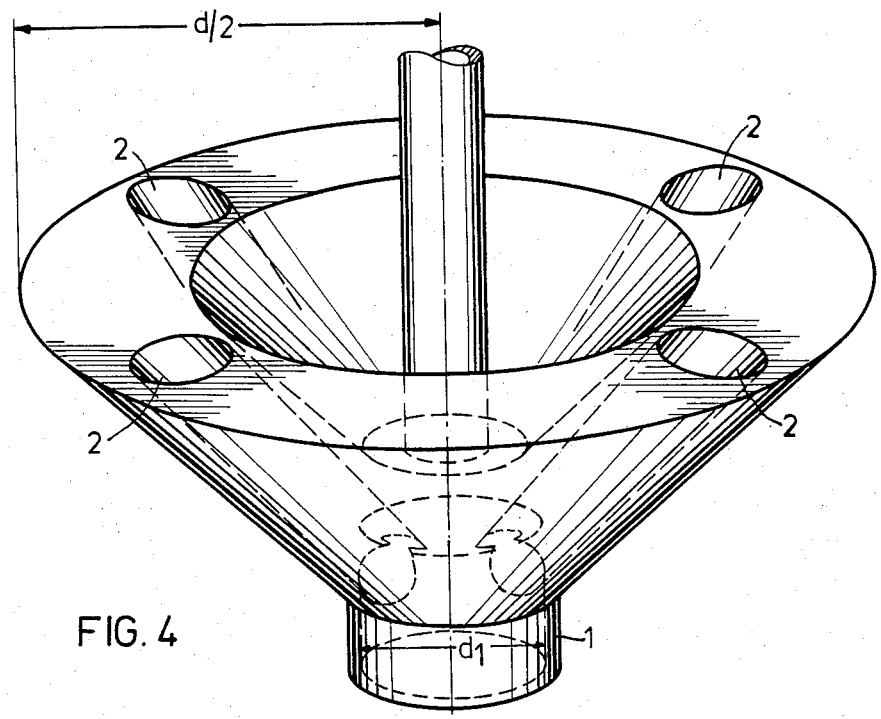

The levelled embodiment of the foam breaker which is shown in FIG. 4 and is prefered, according to the invention, fulfills all the requirements which were mentioned at the beginning as being conditions for an efficient apparatus not requiring maintenance. The foam breaker can also be manufactured from various materials, preferably from light metal or plastic and can be quickly cleaned when necessary.

Preferably the channels have a circular cross-section. The length of the channels is limited according to the invention by the selected angle $\alpha$ and the diameter d. The outlet openings are all situated in one plane within a circle of which the diameter is marked d. In FIGS. 1 and 4 the radius of the circle is marked d/2.

The number of channels has a comparatively small influence on the minimum rotational speed. Particularly good results are achieved according to the invention when the foam breaker contains at least three, preferably 4–10 and with particular preference 4–8 channels.

The diameter d is preferably at least 200 mm, with particular preference over 250 mm.

The internal diameter $d_1$ of the suction tube, in that section where the channels branch off, should be at least 20 mm. In a particularly prefered embodiment, according to the invention, the ratio of d to $d_1$ is between 2 and 6, preferably 3 and 4 and the ratio of d to $d_R$ (=channel diameter) is between 6 and 12, preferably 8 and 10.

According to the previous sentence $d_R$ is coupled with d and is therefore already determined.

I claim:

1. A process for mechanical foam breaking, comprising: drawing foam into a rotating suction tube of which at least 3 channels branch radially upwardly and outwardly at an angle $\alpha$ of approx. 30° to approx. 60°, and throwing the foam outwardly through these channels at a cover disposed immediately thereabove.

2. A process according to claim 1, wherein the diameter d of the circular path of the end points of the channels is at least 200 mm, the diameter $d_R$ of each channel is at least 20 mm and the diameter $d_1$ of the suction tube is at least 40 mm.

3. A process according to claim 1, wherein the ratio of the diameter of the circular path of the end points of the channels to the diameter of the suction tube is between 2 and 6 and to the diameter of each channel is between 6 and 12.

4. A process according to claim 1, wherein $\alpha$ is about 40° to 50° and wherein 4 to 8 channels are provided.

5. A process for mechanically breaking foam comprising:
   drawing the foam to be broken through a vertical suction tube;
   providing a plurality of channels extending radially upwardly and outwardly from the suction tube at an acute angle to the longitudinal axis of the suction tube and which open immediately beneath a cover at an obtuse angle with respect thereto; and
   rotating the suction tube and channels about the longitudinal axis of the suction tube at a sufficient speed to compress foam drawn by the suction tube in the channels and throw the compressed foam at the cover.

6. A mechanical foam breaker comprising:
   a housing including a cover;
   a vertical tube within the housing having a lower end receptive of foam to be broken and an upper end connected to a source of suction;
   a plurality of channels extending radially upwardly and outwardly from the suction tube at an acute angle to the longitudinal axis of the suction tube and opening towards said cover at an obtuse angle and immediately beneath same;
   means for rotating the suction tube and channels about the longitudinal axis of the suction tube at a sufficient speed to compress foam drawn up through the suction tube and into the channels and to throw the compressed foam at the cover.

* * * * *